United States Patent [19]

Campbell

[11] 4,215,650

[45] Aug. 5, 1980

[54] ANIMAL FEEDING APPARATUS

[75] Inventor: Neil E. Campbell, Hasbrouck Heights, N.J.

[73] Assignee: Lab Products, Inc., Rochelle Park, N.J.

[21] Appl. No.: 37,428

[22] Filed: May 9, 1979

[51] Int. Cl.³ ............................................. A01K 5/00
[52] U.S. Cl. ........................................ 119/18; 119/61
[58] Field of Search ................. 119/18, 51 R, 59, 61, 119/63

[56] References Cited

U.S. PATENT DOCUMENTS

| | | | |
|---|---|---|---|
| 1,741,194 | 12/1929 | Levine | 119/61 |
| 1,742,019 | 12/1929 | Williams et al. | 119/61 |
| 3,077,863 | 2/1963 | Chilovich | 119/51 R X |
| 3,554,165 | 1/1971 | Carter | 119/18 |

FOREIGN PATENT DOCUMENTS 2235724  8/1973  Fed. Rep. of Germany ............. 119/18

Primary Examiner—Louis G. Mancene
Assistant Examiner—Robert P. Swiatek
Attorney, Agent, or Firm—Edward F. Levy

[57] ABSTRACT

An animal feeding apparatus comprises an open container, the front portion of which includes an inclined wire mesh ladder which projects outwardly and downwardly from the container and leads to an inclined ramp having a smooth and slippery surface, the ramp extending inwardly and downwardly into the container. A laboratory animal having easily climbed the ladder portion, finds the ramp member slippery, and is therefore restrained from entering the interior of the container. The animal thus remains poised on the ladder, extending only its head into the container to feed, so that food stored in the container remains in a neat and clean condition.

8 Claims, 4 Drawing Figures

U.S. Patent     Aug. 5, 1980     4,215,650
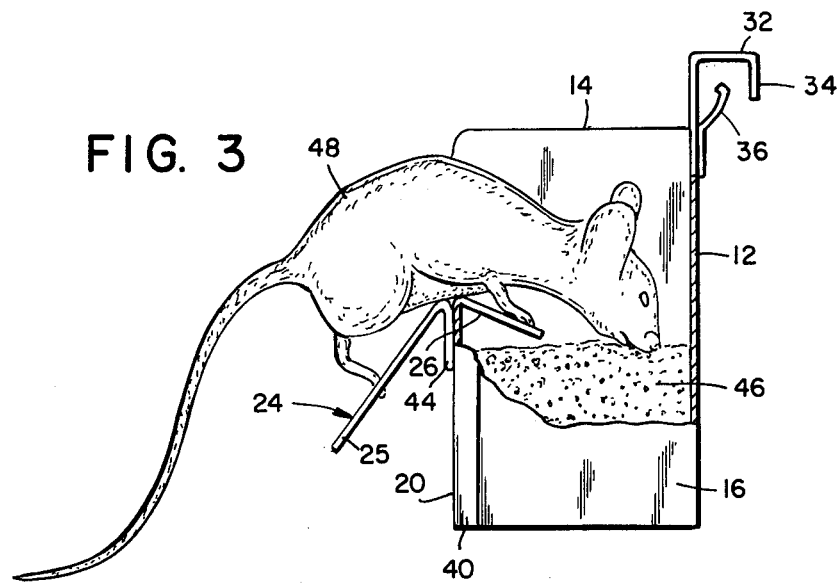
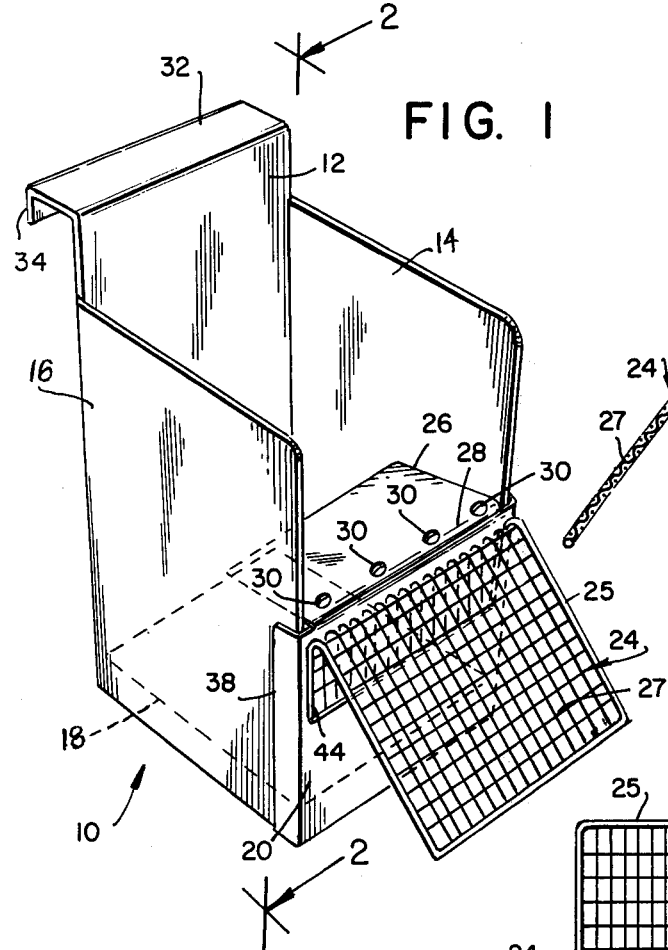
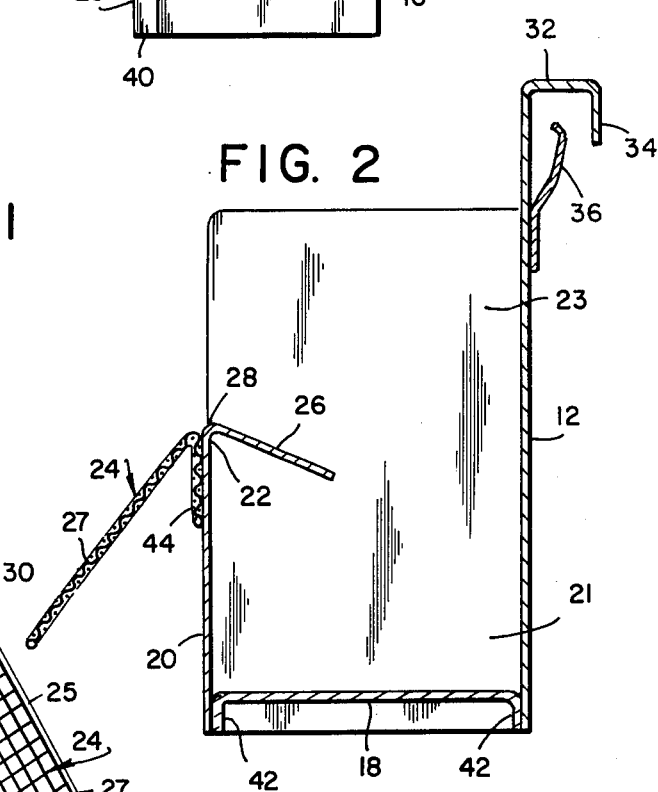
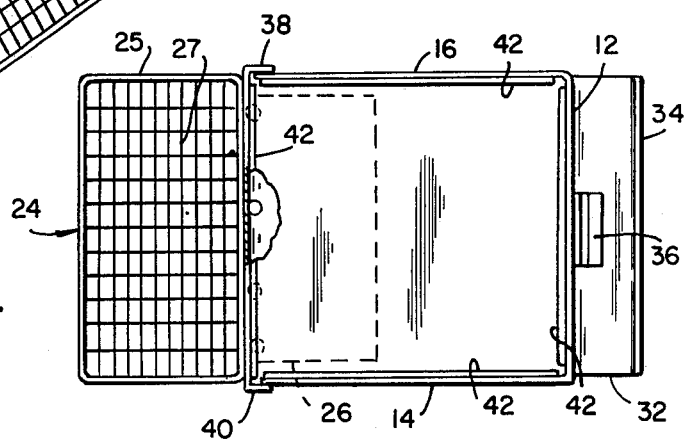

ANIMAL FEEDING APPARATUS

The present invention relates generally to feeding apparatus for laboratory animals and more particularly to a feeding apparatus for use with dry powder feed materials. Powder feed has the consistency of coarse flour, and is light, dry and fine in contrast to pellet feed or soft, moist feed.

The use of powder feed materials for laboratory animals such as guinea pigs, mice and various types of rodents, has presented difficulties in laboratory maintenance and testing procedure because of the tendency of the animals to spill, scatter or contaminate the powder feed. The conventional devices for feeding laboratory animals generally comprise an open-top trough into which the feed is placed. Since rodents or other small laboratory animals find the powder feed attractive for nesting, the animals tend to enter such troughs and remain therein, thereby contaminating the food. Also when entering, leaving or moving about in the troughs, the rodents tend to scatter the powder feed in all directions resulting in a waste of the feed material and causing difficulties in certain types of research projects in which the amount of feed actually consumed by the animal must be measured accurately.

In attempting to keep the animals out of the feed, various types of mesh dividers have been tried, such as mesh coverings for box-like feeders, through which small amounts of powder feed are exposed to the animals. It has been found that when the animals feed through such mesh dividers, they still tend to scatter the powder feed about to an undesirable extent.

Also tried were mesh covers which rest on the powder to allow the animals to get at the food through openings in the mesh. In use of such covers, it was found that the animals walked about on the mesh and tended to nest thereon, with resulting contamination of the food.

Other attempts to overcome these difficulties, including the use of feeders in which a supply of food is held in a container having a small aperture through which the food falls, have generally been unsuccessful because of the tendency of powder feed to cake, thereby preventing free flow.

It is an object of the present invention to overcome the disadvantages of the prior art by providing a feeding trough for laboratory animals, so constructed that the animal is provided with ready access to the feed for eating, and at the same time is discouraged from physically entering the food container.

Another object of the present invention is to provide an animal feeding apparatus for use with dry, granular or powder feed which does not depend on the flow of the feed through small orifices or apertures.

Another object of the present invention is to provide an animal feeding apparatus which may be easily adapted for use by various size laboratory animals.

Another object of the present invention is to provide an animal feeding apparatus having no moving parts and which is free of small interstices in which feed can collect, so that the apparatus may be cleaned or sterilized without difficulty.

Still another object of the present invention is to provide an animal feeding apparatus comprising relatively few simple parts which are economical of manufacture.

In accordance with the present invention there is provided an animal feeding apparatus which comprises a rectangular open top container which has a front panel somewhat shorter than the side and rear panels. At the upper edge of the front panel there is provided a ladder member which projects outwardly and downwardly. The ladder member is made of a wire screen which provides a rough surface and thereby permits a laboratory animal to easily climb to the upper edge of the front panel. Also located at the upper edge of the front panel there is provided a ramp member which projects inwardly, into the container, and downwardly. The ramp member is made of sheet metal and is smooth and slippery.

In use, the laboratory animal, having climbed to the upper edge of the front panel using the ladder member, attempts to climb down into the container to reach feed which has been placed therein. The animal finds the ramp member both slippery and projecting in a downward direction. As a result of instinctive fear of slipping, the animal remains poised at the upper edge of the front panel and feeds by reaching into the container with its head or paws. The feed remains in the container, is not scattered, and remains clean.

Additional objects and advantages of the invention will become apparent during the course of the following specification, when taken in connection with the accompanying drawings, in which FIG. 1 is an overall perspective view of an animal feeding apparatus made in accordance with the present invention;

FIG. 2 is a cross-sectional view of the animal feeding apparatus taken along the line 2—2 in FIG. 1;

FIG. 3 is a side elevational view of the animal feeding apparatus of FIG. 1 with portions shown broken away to reveal details of construction and showing the manner in which a laboratory animal feeds on powdered feed material within the apparatus; and FIG. 4 is a bottom plan view of the animal feeding apparatus of FIG. 1.

Referring in detail to the drawings, there is shown in FIG. 1 an animal feeding apparatus 10 made in accordance with the present invention and comprising a rear panel 12, a pair of side panels 14, 16, a bottom panel 18 and a front panel 20 which form an open top container.

The front panel 20 has a height which is in the order of one-half of the height of the side panels 14, 16 thereby providing a box-like feed receptacle 21 at the lower portion of the apparatus 10, and an open-front area 23 thereabove, as shown in FIG. 2.

At the upper edge 22 of the front panel 20 there is mounted an inclined ladder member 24 and an oppositely inclined ramp member 26, which comprise a major feature of the present invention. The ladder member 24 projects outwardly and downwardly from the upper edge 22 of the front panel 20. The ladder member 24 is formed of a rectangular metal wire rim 25 bordering a supporting body 27 of wire screen material which presents a generally rough surface. This rough surface provides good traction for laboratory animals permitting such animals to easily climb to the upper edge of the front panel 20.

An appropriate angle of inclination between the ladder member 24 and the front panel 20 has been found to be in the order of 40 to 45 degrees. It has also been found that this angle can be varied in order to accommodate different size laboratory animals with the aforementioned angle being decreased, resulting in a steeper ladder member 24 for smaller animals, and with the angle being increased, resulting in a less steep ladder member 24 for larger size laboratory animals. The wire rim 25 of ladder member 24 may be bent by hand to different angles as described above to accommodate various size animals.

The use of wire mesh material for the ladder member 24 has been described by way of example, it being understood that alternative surfaces such as a perforated surface or a convoluted surface, which provide good traction for laboratory animals, may be utilized.

The ramp member 26 is formed of a smooth surface sheet material such as stainless steel, having a polished, slippery upper surface. An appropriate angle of inclination between the ramp member 26 and the front panel 20 has been found to be in the order of 60 to 70 degrees. The length of the ramp member 26 is such that it projects to a point somewhat short of the mid-point of the container interior.

The upper edge 28 of the ramp member 26 is formed with a series of holes 30 which facilitate cleaning the apparatus 10, thereby preventing unwanted accumulation of feed material between the ramp member 26 and the front panel 20.

The upper portion of the rear panel 12 is folded to form a short horizontal section 32 and a short vertical section 34 which together form a hook-like portion. A leaf spring 36 (FIG. 2) is secured centrally on the rear panel 12 and projects into the hook-like portion. The hook-like portion and the leaf spring 36 cooperate to enable the animal feeding apparatus 10 to be clipped onto the edge of a conventional animal cage.

The mechanical construction of the animal feeding apparatus 10 is adapted for fabrication using conventional sheet metal fabrication techniques and equipment. The rear and side panels 12, 14, 16 are formed as a single unitary member. The front panel 20 and the ramp member 26 are also formed as a single unitary member. The front panel 20 includes flaps 38, 40 which partially overlap the side panels 14, 16 and may be joined to the side panels 14, 16 using any one of a number of well-known methods such as spot welding. The bottom panel 18 terminates in depending flanges 42 which are similarly fastened to the front, rear and side panels 20, 12, 16, 18. The ladder member 24 includes a flap portion 44 which is fastened to the front panel 20.

In use, the animal feeding apparatus 10 is filled with powder feed 46 up to a level slightly below the ramp member 26, and is placed inside an animal cage. A laboratory animal 48, in quest of food, quickly climbs the ladder member 24 assisted by the excellent traction afforded by the wire mesh surface. As the animal 48 reaches the top of the ladder member 24, its front paws come to rest upon the slippery surface of the ramp member 26 and have a tendency to slide downwardly, which is sensed by the animal. The animal stops climbing because it is apprehensive of falling into the container. This apprehension is amplified by the side panel 14, 16 which extend upward above the top edges 22 of the front panel 20 and higher than the head of the laboratory animal 48. The animal's fear of entrapment in the animal feeding apparatus 10 is thereby enhanced and the animal 48 will refrain from placing its entire weight on the slippery ramp member 26, but rather will remain poised at the top edge 22 of the front panel 20, as shown in FIG. 3, with its hind legs securely gripping the ladder member 24 while it stretches to reach with its head or paws into the animal feeding apparatus 10 to feed on the food material 46 contained therein. In doing so, the animal 48 is able to easily obtain food with the uneaten food remaining in a clean and neat condition. In some instances, the animal will not even eat while perched precariously on the ladder 24 and slippery ramp 26, but rather will take a small supply of powdered feed in its paws and then climb back down the ladder for eating.

In the feeding apparatus, shown in the drawings by way of example, the side panels 14 and 16 are spaced apart by such a distance as to provide a relatively narrow over-all width, so as to accommodate a single animal for feeding. In an alternative commercial embodiment, the side panels are spaced further apart, and the ladder member 24 and ramp member 26 are made correspondingly wider, thereby permitting two or more laboratory animals to feed simultaneously.

While a preferred embodiment of the invention has been shown and described herein, it is obvious that numerous additions, changes and omissions may be made in such embodiment without departing from the spirit and scope of the invention.

What is claimed is:

1. An animal feeding apparatus comprising an open top enclosure sized to contain a quantity of animal feed and having a front, a back, a pair of spaced side panels and a bottom panel, an inclined ladder member extending outwardly and downwardly from the upper edge of said front panel, and an inclined ramp member extending inwardly and downwardly into said enclosure from said upper edge of said front panel, said ramp member having a smooth and slippery upper surface located to underlie the forward body portion of an animal when the animal climbs said ladder member and attempts to reach the animal feed within said enclosure.

2. An animal feeding apparatus according to claim 1 in which said ladder member is formed with a generally rough surface.

3. An animal feeding apparatus according to claim 2 in which said ladder member is formed of wire mesh and said ramp member is formed of smooth sheet metal.

4. An animal feeding apparatus according to claim 1 in which said ladder member forms an angle in the order of 40 degrees with said front panel.

5. An animal feeding apparatus according to claim 1 in which said ramp member forms an angle in the order of 70 degrees with said front panel.

6. An animal feeding apparatus according to claim 1 in which said side and back panels project a substantial distance above said upper edge of said front panel.

7. An animal feeding apparatus according to claim 1 in which the portion of said ramp member adjacent to said upper edge of said front panel includes a plurality of holes for facilitating cleaning said apparatus.

8. An animal feeding apparatus according to claim 1 in which the ladder member is deformable and the angle of inclination of said ladder member may be varied with a steeper angle of inclination being used for smaller animals and a relatively shallower angle of inclination being used for larger animals.

* * * * *